May 1, 1928.  
J. M. HARRIS  
GRAIN SEPARATOR  
Filed Feb. 25, 1926

Inventor  
John M. Harris  
By Herbert E. Smith  
Attorney

May 1, 1928.  
J. M. HARRIS  
GRAIN SEPARATOR  
Filed Feb. 25, 1926

John M. Harris, Inventor

By Herbert E. Smith

Attorney

Patented May 1, 1928.

1,668,244

UNITED STATES PATENT OFFICE.

JOHN M. HARRIS, OF SPOKANE, WASHINGTON.

GRAIN SEPARATOR.

Application filed February 25, 1926. Serial No. 90,599.

My present invention relates to improvements in grain separators designed for the purpose of separating vetch seed from screenings comprising oats, wheat and other grains. As is well known the vetch seed, of the bean type, is of a rounded formation and the seeds roll freely, while the oats and wheat seeds have a more flattened formation and are not inclined to roll. With these natural differences of the vetch and other grains in mind, I have designed a grain separator which is fashioned with particular parts adapted to the rolling tendency of the vetch grain and with other parts adapted to the sliding movement of the more flat grains as oats and wheat. The machine is thus adapted to impart a rolling movement to the vetch seed and a sliding movement to the wheat and oats as they pass through the machine for the purpose of separating the vetch from the other grains and collecting these separated materials for disposal in usual manner. In accomplishing the separation of the vetch seed from the other grains I utilize inclined shaker tables or oscillatable members over which the material is passed, and I provide novel combinations and arrangements of parts, as will be hereinafter pointed out and claimed for carrying out the principles of my invention.

In the accompanying drawings I have illustrated one complete example of the physical embodiment of my invention wherein the parts are combined and arranged according to the best mode I have thus far devised for the practical application of the principles of my invention.

Figure 6 is an enlarged, fragmentary, perspective view of a portion of one of the shaker or oscillatable tables.

Figure 1:
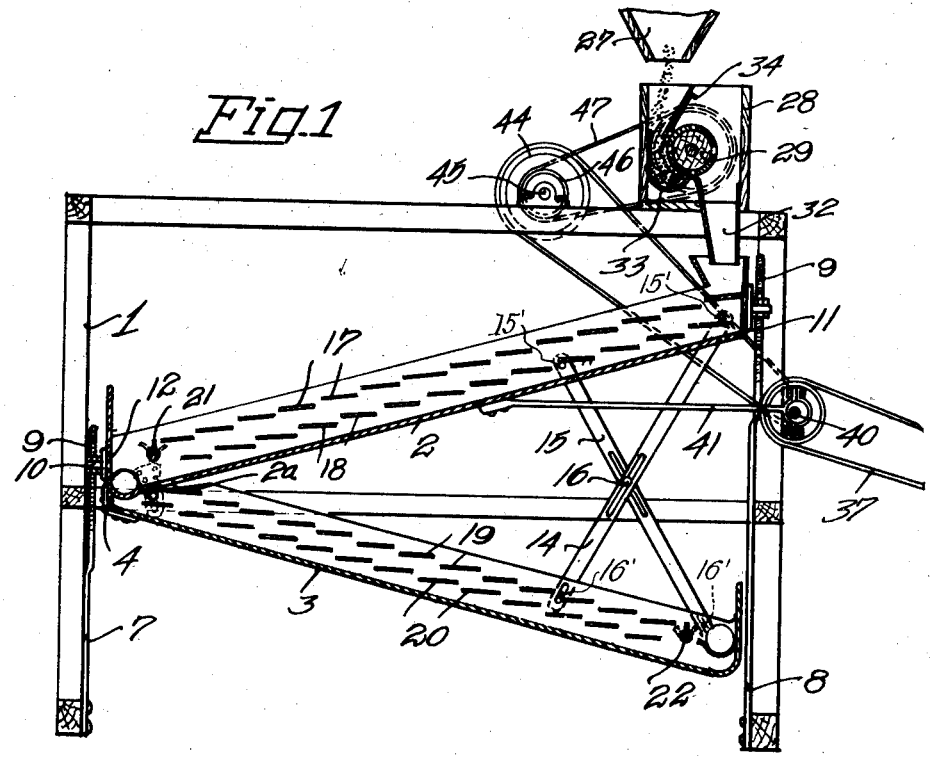
Figure 1 is a vertical, central, longitudinal sectional view of a machine embodying my invention.

In the preferred form of my invention as illustrated in the drawings I utilize an upright, rectangular main frame 1 of suitable construction in which the upper and lower, inclined, oscillatable tables 2 and 3 are suspended. The tables as seen in Figure 1 incline in opposite directions and their adjoining ends are hinged together at 4, which hinged ends are provided with slotted bracket plates 5 and set screws or bolts 6 for fixing them in adjusted relative positions. The tables are arranged longitudinally in the main frame and they are adapted to swing or oscillate longitudinally of the frame, with their upright resilient, metal straps 7 7' and 8 8'. These straps are arranged in pairs, the taller pair at the front of the machine and the shorter pair at the rear of the machine. At their lower ends the straps are bolted to the bottom portion of the frame and at their upper, free ends the straps are fashioned with threaded bolt end 9. These bolt ends pass upwardly through perforated brackets 10 secured to the respective end walls 11 and 12 of the tables 2 and 3, and lock nuts 13 above and below the brackets are used to secure the bolts in the brackets.

At each side of the table 2 of the vertically arranged tables a pair of crossed slotted, diagonal braces 14 and 15 are pivoted at 15'. At the intersection of these crossed slotted braces a thumb screw 16 is used to secure the crossed braces and similar screws or bolts 16' are used to clamp the slotted ends of the braces to the table 3. As thus constructed the hinged tables may be relatively adjusted with respect to their inclinations and secured in adjusted position by means of the screws or bolts 6, 16, and 16', and the tables may be vertically adjusted as a rigid structure by means of the stud bolts 9, brackets 10 and nuts 11.

Each table is provided with two rows or series of spaced slats or plates as 17 and 18 in the upper table and 19 and 20 in the lower table. These slats extend transversely of the tables and the slats of the upper rows are staggered with relation to the slats of the lower rows. It will be understood that the vetch or round grains or berries are adapted to roll down the upper series of slats 17 or 19 and the oats and wheat to slide over the lower rows or series of slats 18 and 20.

At the lower end of the upper series of slats 17 a gate 21 is provided and at the lower end of the rows of slats 19 a similar gate 22 is provided. These gates are located transversely of the tables and are each carried by a rock bar 23 journaled in the side walls of the tables and adapted to be clamped in adjusted position with relation to the separator plates or slats 17 and 19 as indicated by dotted lines in Figure 6.

The gate 21 is designed to guide the vetch beans into a transversely extending trough 25 located in the lower end of the table 2 and the gate 22 is designed to guide the vetch beans that may pass from table 2 to table 3, and so down over the series of slats 19, to a transversely arranged trough 26. The oats and wheat, after the vetch beans have been separated therefrom, are caught in the trough 26′ which extends transversely from one side of the table 3 at its lower end.

The material is fed to the machine from the hopper 27, suitably supported at the proper elevation, and passes through a transversely extending feed regulator casing or box 28 located on the top of the main frame. Within the casing or box is arranged a transversely extending feed-regulator roller 29 having a perforated shell 30 which forms feed pockets 31′ for the grain. The roller 29 is preferably of wood and the perforated shell 30 is of metal with its perforations arranged in staggered formation or spiral series. The feed regulator roller is provided with a shaft 31 journaled in suitable bearings in the end walls of the casing 28 and it will be understood that the roller is rotated to regulate the feed of the material from the casing through the discharge spout 32 to the upper end of the table 2.

Figure 2:
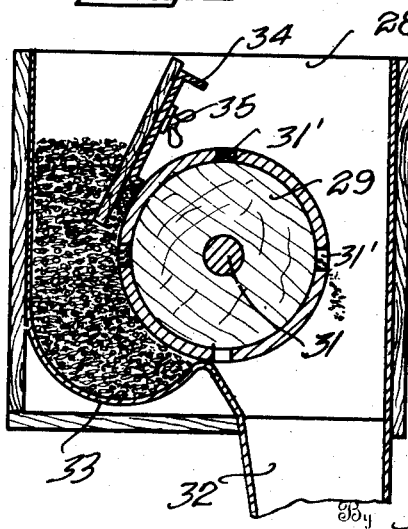
Figure 2 is an enlarged, detail sectional view of the feed regulator mechanism.
Figure 3:
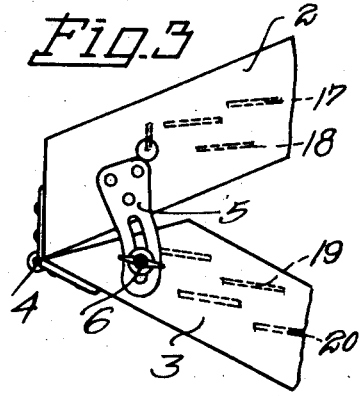
Figure 3 is an enlarged detail view showing the hinged shaker tables.
Figures 4, 5:
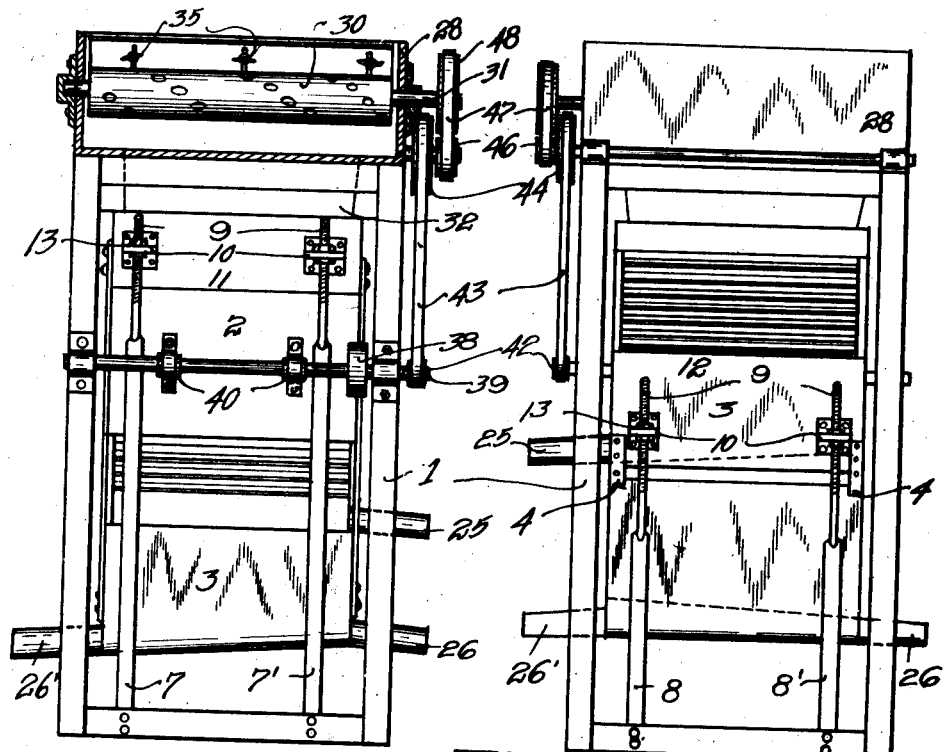
Figure 4 is a front end elevation of the machine as seen from the right in Figure 1 with the feed regulator casing in section.
Figure 5 is a rear end elevation of the machine as seen from the left in Figure 1.
Figures 7, 8:
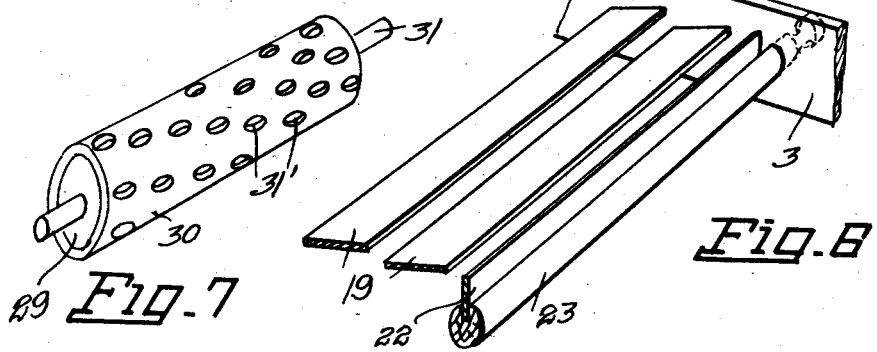
Figure 7 is a perspective view of the feed regulator roll.

At the bottom of the casing 28 is arranged a concave pan 33 for holding a supply of material between the roller and one wall of the casing, and the roller is provided with a scraper or shield 34 extending longitudinally thereof and bearing lightly thereon to scrape the material from the exterior face of the roller-shell and prevent excessive feed of the material. This scraper is supported by means of a number of set screws 35 at the back of a cross board 36 rigid with the interior walls of the casing. The feed-regulator roller revolves clockwise and the pockets gather quantities of the material and empty such quantities into the discharge spout 32 as indicated in Figure 2.

The rotary movement of the feed regulator and the oscillating movement of the tables are synchronized with the speed of rotation of the feed regulator materially reduced below the speed of oscillation of the tables. These moving parts are driven from a drive belt 37 actuated from a suitable source of power and the belt drives a pulley 38 on the main shaft or operating shaft 39 journaled in suitable bearings at one end of the main frame.

A pair of eccentrics 40 are spaced on the operating shaft 39 and they are connected by means of the eccentric rods 41 to the under side of the upper table 2, and it will be apparent that as the main shaft revolves the tables are caused to oscillate on their resilient uprights or supports 7 7′ and 8, 8′.

For transmitting power to the feed regulator a small pulley 42 is keyed on the main shaft and a belt 43 passes from this pulley to the larger pulley 44 on a countershaft 45 journaled in suitable bearings on the top of the main frame. A pulley 46 on the countershaft is equipped with a belt 47 that passes over a larger pulley 48 on the feed regulator shaft 31, and through the instrumentality of these driving parts the feed regulator is rotated, as described.

With the machine in operation it will be apparent that the material is fed to the upper end of the table 2 and is caused to travel to the left in Figure 1 over the spaced slats 2. The vetch or round seeds roll rapidly down the incline from one slat to another until the gate 21 guides them to the discharge spout 25. The oats, wheat &c, which do not roll, slide more slowly and fall through the spaces between the slats 17 to the lower row of slats 18 or to the inclined bottom of the table 2. The slower moving material is thus caused to drop through the transversely disposed opening 2ª in the lower end of the bottom of the table 2 before said material can reach the outlet or discharge trough at the lower end of the upper table. With this slower moving material some vetch beans may still remain and they are dropped with the oats and wheat onto the upper slat of the upper row of slats 19 of the lower table. As the rigidly connected tables are bodily oscillating the same performance is repeated in the lower table— the slower moving material is shifted and slid over the slats 19 to drop through the spaces between the slats and fall upon the lower row of slats 20. The more rapidly rolling vetch beans roll down the inclined series of slats 19 to the gate 22 which guides them to the discharge spout 26. The slower moving material slides down the lower row of slats 20 or the inclined bottom of the table 3 to the discharge trough and spout 26′ to be collected for use.

Having thus fully described my invention, what I claim as new and desire to secure by Letters Patent is—

1. The combination with a pair of hinged, oppositely extending inclined shaker tables having transversely extending slats, of pairs of slotted X-bars at the sides of said tables and means for securing said bars in adjusted position, a pair of resilient uprights supports at the ends of the tables and stud bolts on said supports, brackets for said bolts on the opposite ends of the tables, and lock nuts for co-action with said brackets and bolts.

2. In a grain separator, the combination with a plurality of superimposed shaker tables having transversely extending slats and arranged in oppositely inclined successive relation, rigid members interconnecting successive tables for relative adjustment therebetween, oscillatable supports for said tables, and means for vertically adjusting all of said tables, from the topmost table, as a unit on said supports.

3. In a grain separator, the combination with a plurality of superimposed shaker tables having transversely extending slats and arranged in oppositely inclined successive relation, of means for adjusting the angular relation between successive tables and rigidly connecting all of said tables as a unit, oscillatable supports, means connecting one of said tables to said supports and arranged for moving all of said tables as a unit vertically therein, and means for oscillating said tables.

In testimony whereof I affix my signature.

JOHN M. HARRIS.